US006796036B1

(12) United States Patent
Klarer

(10) Patent No.: US 6,796,036 B1
(45) Date of Patent: Sep. 28, 2004

(54) APPARATUS AND METHOD FOR MAINTAINING WHEEL ALIGNMENT SENSOR RUNOUT COMPENSATION

(75) Inventor: John D. Klarer, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/378,305

(22) Filed: Mar. 3, 2003

(51) Int. Cl.[7] .......................................... G01B 11/275
(52) U.S. Cl. ........................... 33/203; 33/1 PT; 33/707
(58) Field of Search .............................. 33/1 N, 1 PT, 33/203, 707, 613, 645

(56) References Cited

U.S. PATENT DOCUMENTS

| | | | |
|---|---|---|---|
| 3,279,084 A | * 10/1966 | Hindin et al. | .................. 33/203 |
| 4,138,825 A | 2/1979 | Pelta | |
| 4,180,915 A | 1/1980 | Lill et al. | |
| 4,381,548 A | 4/1983 | Grossman et al. | |
| 4,414,754 A | * 11/1983 | Lapeyre | ...................... 33/707 |
| 4,879,670 A | 11/1989 | Colarelli, III | |
| RE33,144 E | 1/1990 | Hunter et al. | |
| 4,953,296 A | 9/1990 | Spainhour | |
| 5,052,111 A | 10/1991 | Carter et al. | |
| 5,129,725 A | * 7/1992 | Ishizuka et al. | ............... 33/707 |
| 5,152,066 A | * 10/1992 | Rieder et al. | ................ 33/1 PT |
| 5,442,858 A | * 8/1995 | Wolters et al. | ................ 33/1 N |
| 5,598,357 A | 1/1997 | Colarelli, III et al. | |
| 5,778,542 A | * 7/1998 | Spoto | ........................... 33/1 N |
| 6,093,928 A | * 7/2000 | Ohtomo et al. | ................ 33/707 |
| 6,427,346 B1 | 8/2002 | Stieff et al. | |
| 6,470,577 B1 | * 10/2002 | Tondorf et al. | ............. 33/1 PT |
| 6,574,876 B2 | * 6/2003 | Takeuchi | ..................... 33/1 PT |
| 2002/0020070 A1 | * 2/2002 | Takeuchi | ..................... 33/1 PT |
| 2003/0182810 A1 | * 10/2003 | Sano | .......................... 33/1 PT |

* cited by examiner

Primary Examiner—G. Bradley Bennett
(74) Attorney, Agent, or Firm—Polster, Lieder, Woodruff & Lucchesi, L.C.

(57) ABSTRACT

A photo-interruptive sensor and an associated interrupter disk are configured to operate in conjunction with a relative rotational position sensor to provide an absolute rotational position of a mounting shaft relative to a vehicle wheel alignment sensor unit. The interrupter disk is secured relative to the mounting shaft of the vehicle wheel alignment sensor, and the photo-interruptive sensor is secured in operative relationship to the interrupter disk. The interrupter disk is configured with a raised peripheral lip having multiple teeth and gaps, each of a unique arcuate length. Signals from the photo-interruptive sensor, together with relative rotational position signals from the relative rotational position sensor in operative relationship to the mounting shaft, are conveyed to a sensor processor and utilized to store, in a sensor memory area, one or more absolute mounting shaft rotational positions. An internal power source maintains the integrity of the sensor memory for a definite span of time during momentary system power losses such as battery changes or during overnight shutdowns, permitting the mounting shaft runout compensation values to be maintained and utilized upon the restoration of system power.

27 Claims, 6 Drawing Sheets

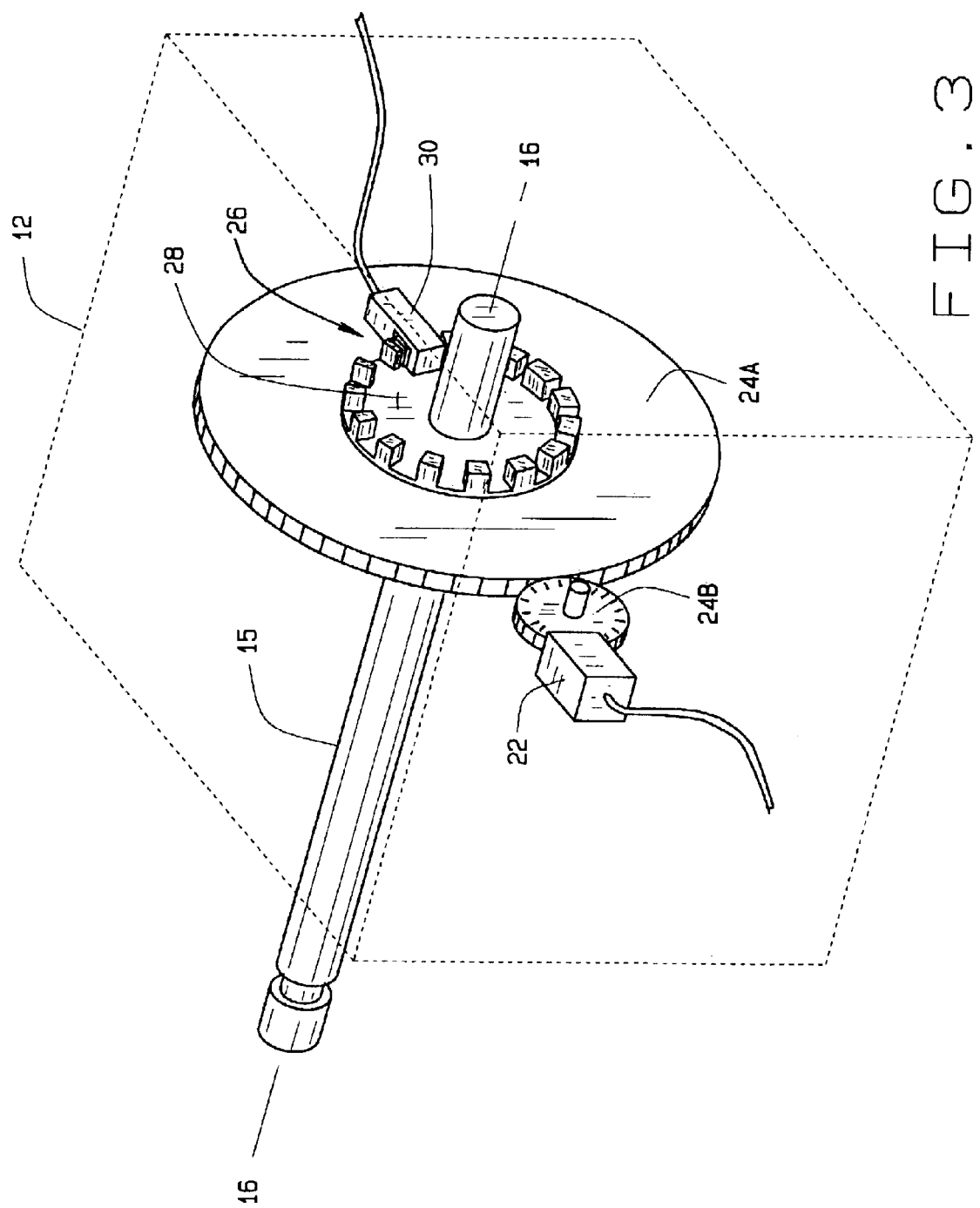

APPARATUS AND METHOD FOR MAINTAINING WHEEL ALIGNMENT SENSOR RUNOUT COMPENSATION

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to vehicle wheel alignment sensors of the type which are pendulously secured to a vehicle wheel by a mounting shaft during a vehicle wheel alignment procedure, and in particular, to an apparatus and method for identifying and tracking the absolute mounting shaft rotational position of the vehicle wheel alignment sensor after it has been mounted to a vehicle wheel.

Computer controlled vehicle wheel alignment systems, such as those shown in U.S. Reissue Pat. No. 33,144 to Hunter et al., U.S. Pat. No. 4,381,548 to Grossman et al., and U.S. Pat. No. 5,598,357 to Colarelli et al., utilize a number of wheel-mounted alignment sensors, such as those described in U.S. Pat. No. 4,879,670 to Colarelli, to obtain measurements related to vehicle wheel alignment parameters. The majority of vehicle wheel alignment sensors currently utilized in the market are "cordless", relying on internal rechargeable batteries to power associated circuitry, and communicating to a console wheel alignment computer using conventional wireless communications technology. One example of a conventional computer controlled vehicle wheel alignment system is the Series 811 console, which utilizes the DSP-500 series cordless vehicle wheel alignment sensors, and is sold by Hunter Engineering Company of Bridgeton, Miss.

It is known in the industry that vehicle wheel alignment sensors which are pendulously secured to individual vehicle wheels must be compensated for any runout present between a plane in which the vehicle wheel alignment sensor hangs, and a plane perpendicular to the rotational axis of the wheel. The preferred procedures for obtaining runout compensation generally involve mounting a vehicle wheel alignment sensor to a vehicle wheel using a wheel clamp, rotating the wheel and mounting shaft to three distinct rotational positions relative to the sensor housing, and obtaining sensor readings for each position. Using the three sensor readings, a sinusoidal pattern representative of the amount of runout present between the vehicle wheel alignment sensor and the vehicle wheel may be calculated for any rotational position of the vehicle wheel and/or sensor. This runout compensation procedure for a vehicle wheel alignment sensor is described in detail in U.S. Pat. No. 5,052,111 to Carter et al.

Once the runout compensation procedure has been successfully completed, the vehicle wheel alignment sensor establishes a relative base rotational position of the mounting shaft. Utilizing an inexpensive relative rotational position sensor, the vehicle wheel alignment sensor tracks the rotation of the mounting shaft relative to the base rotational position. By tracking the change in the rotational position of the vehicle wheel alignment sensor from the base position, a runout compensation value for the current rotational position of the is calculated from the previously obtained sinusoidal pattern.

One drawback to using inexpensive relative rotational position sensors is an inability of the sensor to identify an absolute rotational position of the vehicle wheel alignment sensor if the established base rotational position is lost. The established base rotational position in a conventional vehicle wheel alignment sensor can become lost for a number of reasons. For example, if the rechargeable batteries supplying power to maintain the wheel alignment sensor memory fail, or require replacement or recharging, data stored in the memory such as the established base rotational position and sinusoidal pattern will be lost, requiring an operator to repeat the time consuming compensation procedure before vehicle wheel alignment can be resumed. Similarly, in rare cases, battery supplied power can be lost momentarily due to poor or unclean battery contacts.

Even if the data values are stored in a persistent memory, such as one receiving power from a capacitor, which will maintain the data values for a limited period of time until the restoration of the normal power supply, any relative rotational movement between the vehicle wheel alignment sensor, mounting shaft, or vehicle wheel will not be recorded by the relative rotational position sensor, resulting in a discrepancy between the rotational position in which the sensor was compensated, and the current rotational position as identified by the relative rotational position sensor upon restoration of power. Finally, if an operator desires to suspend work on a vehicle in the middle of a vehicle wheel alignment procedure, and shuts down the alignment system (such as overnight), the stored data may be lost, and any rotational movement of the mounting shaft relative to the vehicle wheel alignment sensor will not be tracked, requiring the runout compensation procedures to be repeated upon the subsequent system startup.

It is known that an absolute rotational position sensor may be utilized in place of the relative rotational position sensor in a cordless vehicle wheel alignment sensor. An absolute rotational position sensor relies upon unique identification markings associated with the mounting shaft to identify the current absolute rotational position of a fixed point on the mounting shaft relative to the vehicle wheel alignment sensor. However, to align modern vehicles, a very high degree of precision is required in the sensor rotational position measurements. When utilizing an absolute rotational position sensor in such a high precision environment, the sensor must be capable of identifying rotational positions to the same degree of accuracy, and therefore requires a number of unique markings proportional to the required degree of accuracy. Absolute rotational position sensors capable of measuring rotational positions to the required accuracy levels for vehicle wheel alignment are delicate and costly items, and are generally unsuited for use in a vehicle service environment.

Accordingly, there is a need in the industry for an alternative device and method for maintaining cordless vehicle wheel alignment sensor runout compensation values and rotational positions following momentary or extended losses of power, which do not rely upon the use of delicate and costly absolute rotational position sensors in the vehicle wheel alignment sensor.

BRIEF SUMMARY OF THE INVENTION

Briefly stated, an apparatus of the present invention incorporated into a conventional cordless vehicle wheel alignment sensor consists of a photo-interruptive sensor and an associated interrupter disk configured to operate in conjunction with a conventional relative rotational position sensor to provide an absolute rotational position of the mounting shaft relative to the vehicle wheel alignment sensor. The interrupter disk is secured to the mounting shaft of the vehicle wheel alignment sensor, and the photo-interruptive sensor is secured to the body of the vehicle wheel alignment sensor, in operative relationship to the interrupter disk. The interrupter disk is configured with a raised peripheral lip having multiple gaps and teeth, each having a unique size. Signals from the photo-interruptive sensor, together with relative rotational position signals from the relative rotational position sensor in operative relationship to the mounting shaft, are conveyed to a sensor processor and utilized to store, in a sensor memory area, one or more absolute mounting shaft rotational positions. An internal power source, such as a capacitor maintains the integrity of the sensor memory for a definite span of time during momentary power losses such as battery changes or during overnight shutdowns, permitting the mounting shaft runout compensation values to be maintained and reutilized upon the restoration of system power, without the need to repeat the runout compensation procedures.

As a method, the present invention requires a vehicle wheel alignment sensor which has been previously mounted to a vehicle wheel and compensated for runout. To restore or identify an absolute rotational position of the mounting shaft relative to the vehicle wheel alignment sensor, the sensor is rotated about the mounting shaft through at least an arc sufficient to completely traverse at least one uniquely sized tooth or gap on an interrupter disk associated with the mounting shaft. Signals from a photo-interruptive sensor, together with a relative rotational position sensor signal, identify the unique size of the traversed tooth or gap on the interrupter disk. The identified unique size of the traversed tooth or gap is compared with permanently stored information to identify the current absolute rotational position of the vehicle wheel alignment sensor mounting shaft. The current absolute rotational position is then utilized to determine the associated runout compensation value for the current sensor rotational position, using data stored in a persistent sensor memory during a runout compensation procedure, thereby permitting an operator to return the vehicle wheel alignment sensor to a previous rotational position or utilize stored runout compensation data following a general power-down or momentary power loss, such as battery contact failure or during battery replacement or recharging.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3 is a perspective view of an absolute rotational position sensor apparatus of the present invention shown coupled to a vehicle wheel alignment sensor unit mounting shaft;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
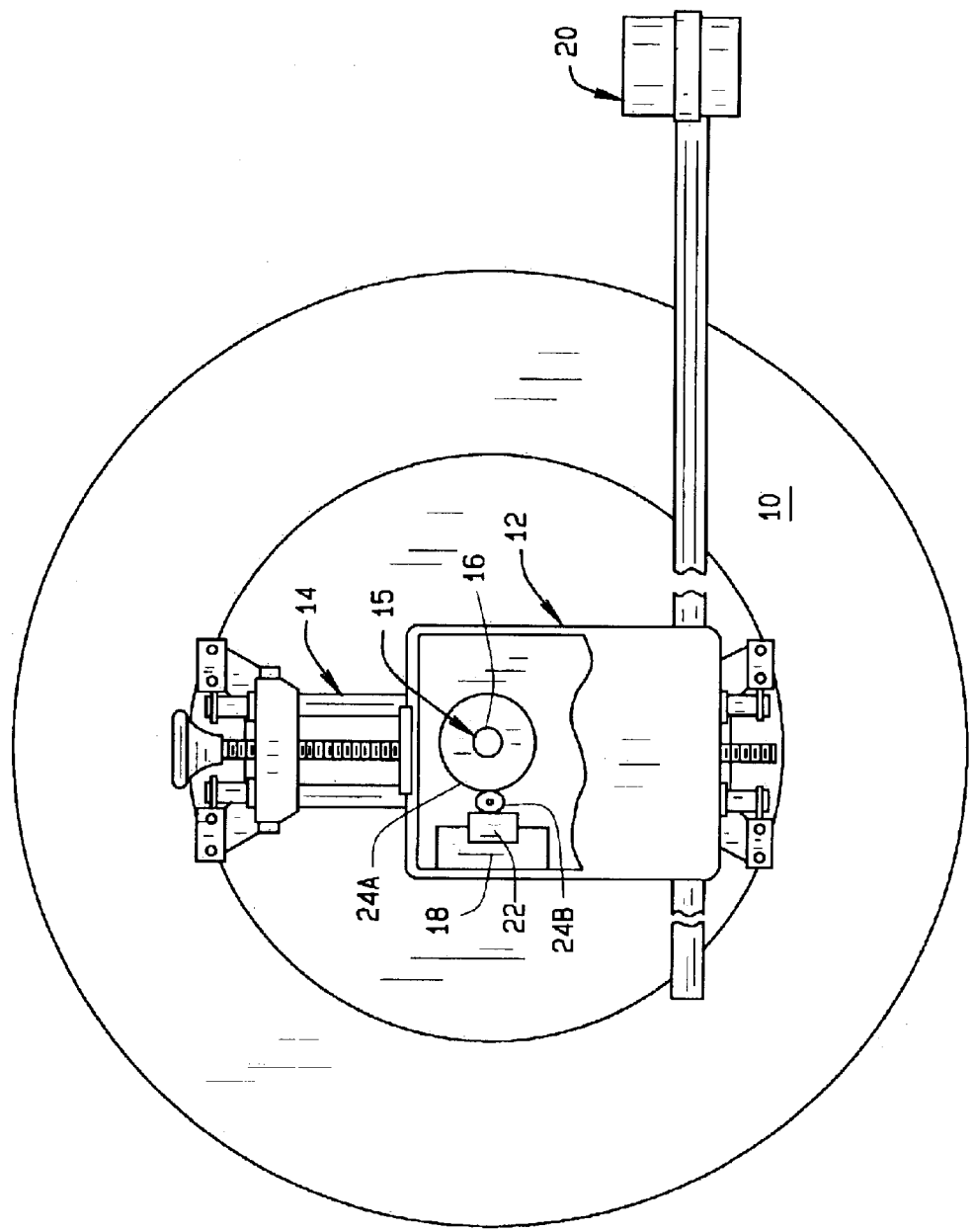
FIG. 1 is a side view in schematic form of a vehicle wheel together with a prior art cordless vehicle wheel alignment sensor mounted pendulously to the wheel.

Referring to FIG. 1, there is shown a vehicle wheel 10 of an automotive vehicle, to which a conventional cordless vehicle wheel alignment sensor unit 12 is mounted by means of a suitable conventional wheel clamp 14. The wheel alignment sensor unit 12 is pendulously mounted to the wheel 10 through wheel clamp 14 on a mounting shaft 15 so as to swing freely about an axis which is approximately coaxial with the axis of rotation 16 of the wheel 10. The sensor unit 12 carries a first angle sensor 18 which develops an electric signal representative of the angular position of the sensor unit 12 relative to the vertical plane. A second angle sensor 20, also carried by the sensor unit 12, develops an electric signal representative of the angular position of the sensor unit 12 relative to the horizontal plane. The angle sensors 18 and 20 are conventional in the wheel alignment art for making camber and toe measurements, and additional sensors (not shown) are commonly carried by the sensor unit 12 for making other angle measurements used in the alignment of the wheels of a vehicle.

The sensor unit 12 also carries a relative rotational position sensor 22 disposed in operative relationship to the mounting shaft 15, which develops an electric signal when the sensor unit 12 and vehicle wheel 10 rotate relative to each other. The signal, which may consist of a train of unidirectional pulses generated for each predetermined increment of rotation between the sensor unit 12 and the mounting shaft 15, is used to correlate the measurements made by the angle sensors 18 and 20 with the rotational position of the mounting shaft 15 relative to the vehicle wheel 10 and/or sensor unit 12 at the time the measurements are made. Measurements are made both during runout compensation procedures and in subsequent wheel alignment measurements. The relative rotational position sensor 22 may be of conventional design, directly driven by the mounting shaft 15, or may be indirectly driven through a one or more gears 24A and 24B to provide an increased rotational position resolution.

Figure 2:
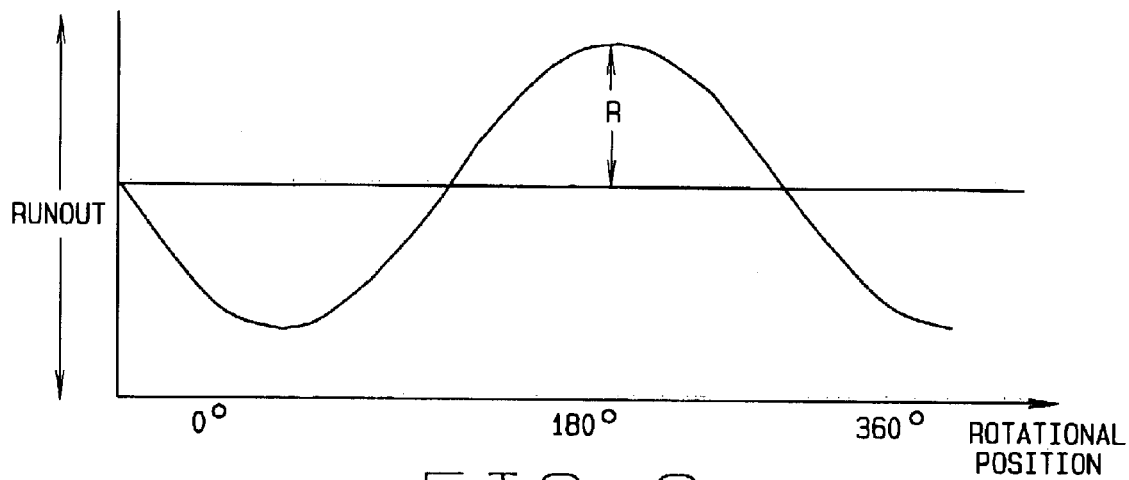
FIG. 2 is an exemplary illustration of the sinusoidal waveform of the runout of the vehicle wheel and alignment sensor shown in FIG. 1 in the toe plane.

It is well known that any wobble of the wheel 10 or of the sensor unit 12 as during rotation affects the measurements made by the angle sensor 18 and 20. As can be seen in FIG. 2, wobble or runout present may be represented as a sinusoidal waveform, where the amplitude of the waveform at a given rotational position of the wheel and/or sensor represents the amount of runout present at that rotational position. It is necessary, therefore, either to eliminate the wobble or runout, or to compensate for it. Since in many cases it is impractical to eliminate the wobble, the usual practice is to modify the actual toe and camber measurements to correct for the wobble or runout at each rotational position. A suitable method for calculating and utilizing runout present at each rotational position is described in U.S. Pat. No. 5,052,111 to Carter, et al.

Turning to FIG. 3, an absolute rotational position sensor assembly of the present invention is shown generally at 26, coupled to mounting shaft 15. Housing components which surround and support the mounting shaft 15, and which comprise the body of the vehicle wheel alignment sensor unit 12 are shown in phantom in FIG. 3 for purposes of clarity. The absolute rotational position sensor assembly 26 preferably consists of an interrupter disk 28 secured in a fixed coaxial relationship with the mounting shaft 15, and a photo-interrupter sensor 30 operatively disposed adjacent the interrupter disk 28. The absolute rotational position sensor assembly 26 operates in cooperation with the conventional relative rotational position sensor 22 which is operatively coupled to the mounting shaft 15 through gears 24A and 24B. Preferably, gears 24A and 24B are selected such that gear 24B, about which the relative rotational position sensor 22 is disposed, rotates through one complete revolution for each ¼ revolution of gear 24A, which is in a fixed coaxial relationship with the mounting shaft 15, thereby providing increased precision in measuring the rotation of the mounting shaft 15.

Figure 4:
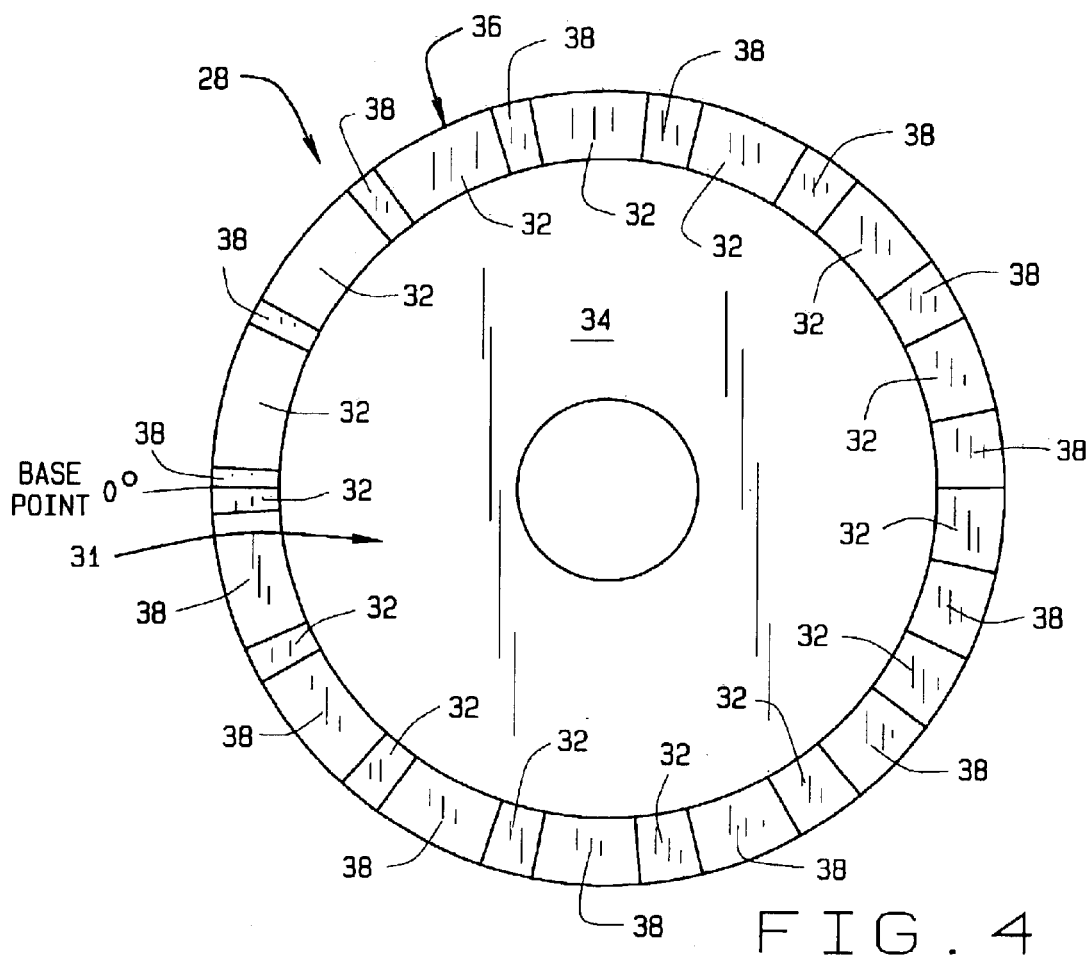
FIG. 4 is a top plan view of an interrupter disk of the present invention.
Figure 5:
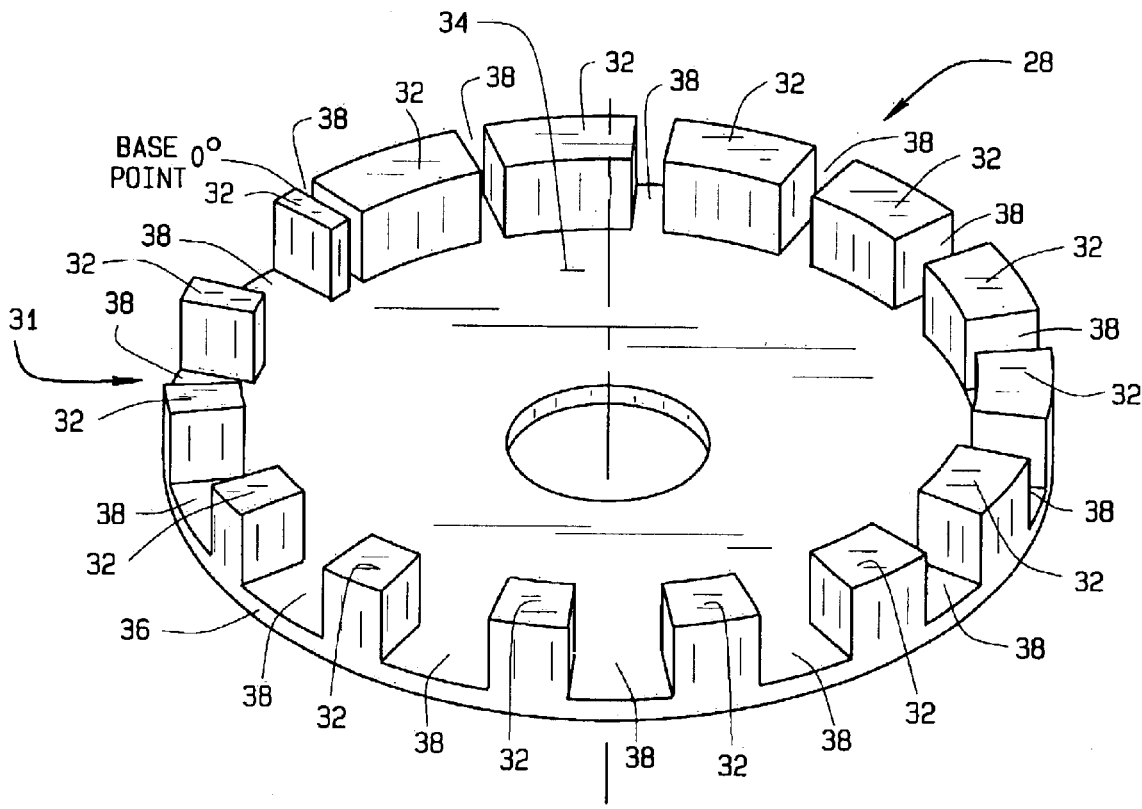
FIG. 5 is a perspective view of the interrupter disk of FIG. 4.

The interrupter disk 28, shown in FIGS. 4 and 5, consists of a circular base 31 which is mounted in a fixed relationship coaxial with the mounting shaft 15. The circular base 31 may be either secured to the face of gear 24A, which is, in turn, mounted in a fixed relationship coaxial with the mounting shaft 15, or directly about the mounting shaft 15. A plurality of merlons or teeth 32 are disposed on a face 34 of the circular base 31, adjacent the circumferential edge 36. Starting from a predetermined position on the circumferential edge 36, designated as the 0° base point, each sequential tooth 32 has a unique and increasing arcuate length. Correspondingly, a crenellation or gap 38 is disposed between each sequential tooth or merlon 32, having a unique and decreasing arcuate length.

Preferably, there are a total of fifteen unique teeth 32 disposed on the face 34, and a total of fifteen interposed unique gaps 38. As shown in the preferred embodiment of FIG. 4, the smallest tooth 32 has an arcuate length of 4°, and each counter-clockwise sequential tooth 32 increases in arcuate length by 1.25°, to a maximum tooth 32 arcuate length of 2.5°. Correspondingly, the largest gap 38, disposed between the first and second teeth 32 has an arcuate length of 200, with each counter-clockwise sequential gap 38 decreasing in arcuate length by 1.250° to a minimum gap 38 arcuate length of 2.5°. Since each tooth 32 and gap 38 has a unique arcuate length, each transition point between a tooth 32 and a gap 38 defines a known absolute rotational position measured relative to a predetermined rotational position or origin point about the circumferential edge 36. Those of ordinary skill in the art will recognize that the number, sizes, and placement of the unique teeth 32, and correspondingly, the unique gaps 38 may be altered within the scope of this invention, so long as each remains uniquely sized, and the circumferential placement of each is known relative to the 0° base point.

Correspondingly, those of ordinary skill in the art will further recognize that alternate embodiments of the present invention may be constructed by replacing the interrupter disk 28 and photo-interrupter sensor 30 with one or more unique markings disposed in a fixed relationship to the mounting shaft 15, and a corresponding sensor configured to observe the unique marking. For example, an identification disk having alternating light and dark markings of unique sizes at known rotational positions may be operatively secured coaxial with the mounting shaft 15, and observed by an optical sensor in the same manner as the teeth 32 and gaps 38 of the interrupter disk 28.

As shown in FIG. 3, the photo-interrupter sensor 30 of the preferred embodiment is disposed in operative relationship to the interrupter disk 28, such that during rotation of the interrupter disk 28, the alternative teeth 32 and gaps 38 pass through a detector region of the photo-interrupter sensor 30. Photo-interrupt sensor 30 is of a conventional design, and includes a detector region in which light passes, such that a sensor detects the presence or absence of light. Preferably, when a gap 38 is rotated through the detector region of the photo-interrupter sensor 30, a first signal is generated, representing an uninterrupted state. When a tooth 32 is rotated through the detector region of the photo-interrupter sensor 30, a second signal is generated, representing an interrupted state.

Figure 6:
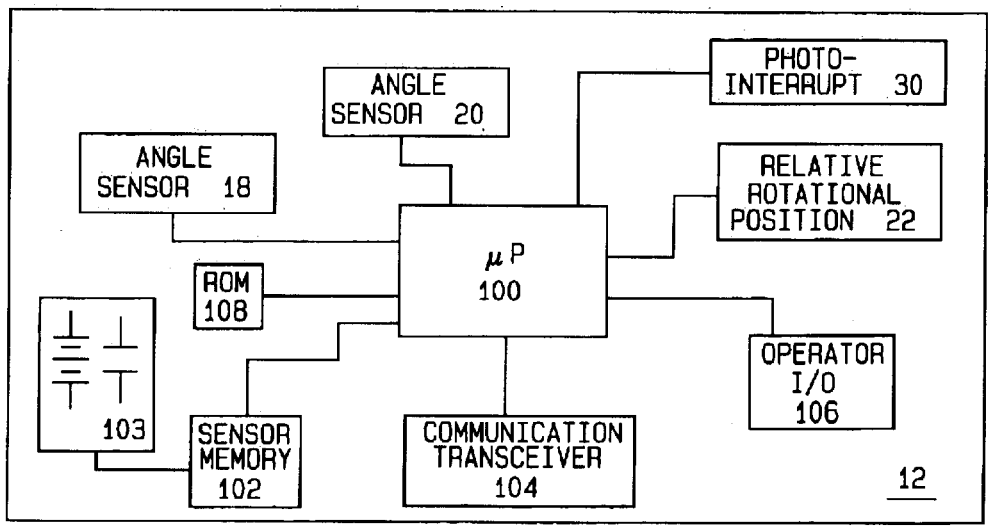
FIG. 6 is a block diagram view of the components of a cordless vehicle wheel alignment sensor incorporating the present invention.

As shown in FIG. 6, the first and second signals from the photo-interrupter sensor 30 are routed to a micro-processor or logic circuit 100 in the vehicle wheel alignment sensor unit 12, and provide sufficient information to identify edge transition points on the interrupter disk 28 between each tooth 32 and an adjacent gap 38, as the edge transition passes through the detector region of the photo-interrupter sensor 30. In addition to receiving signals from the photo-interrupter sensor 30, the micro-processor or logic circuit 100 is configured to communicate with the conventional components of the wheel alignment sensor unit 12. These include the angle sensors 18, 20, the relative rotational position sensor 22, a sensor memory 102, a communications transceiver 104, such as a radio-frequency or infra-red communications unit, and one or more conventional operator I/O devices 106 such as buttons or LEDs disposed on the wheel alignment sensor unit 12. The sensor memory 102 is preferably linked to a short-term power supply 103, such as an internal battery or a super-capacitor, capable of providing sufficient power to maintain stored data in the sensor memory 102 during interruption or shutdown of a normal power supply (not show). Alternatively, sensor memory 102 may be a form of re-writable persistent memory, such as MRAM, which does not require a continuous supply of power to maintain stored data values.

In addition to being configured to perform the conventional functions of a vehicle wheel alignment sensor, the micro-processor or logic circuit 100 is configured to utilize the signals received from the photo-interrupter sensor 30 together with signals received from the relative rotational position sensor 22 to identify an absolute rotational position of the mounting shaft 15 relative to the vehicle wheel alignment sensor unit 12. The relative rotational position sensor 22 provides two pieces of information to the micro-processor or logic circuit 100, a rotational distance and a direction of rotation. The rotational distance identifies the length of an arc about the mounting shaft 15 in which the vehicle wheel alignment sensor unit 12 has rotated, while the direction of rotation identifies if the rotation is clockwise or counter-clockwise. Combined with a pair of sequential signals from the photo-interruptive sensor 30 identifying a first and second edge transitions between a tooth 32 and a gap 38, the micro-processor or logic circuit 100 can identify the unique arc length of each tooth 32 or gap 38 passing through the detector region of the photo-interruptive sensor 30.

Using a look-up table or known relationships correlating tooth and gap arc length with absolute rotational positions stored in a persistent sensor memory 108 such as an ROM, EPROM, or EEPROM, the micro-processor or logic circuit 100 determines, from the identified unique arc length of a tooth 32 or gap 38 passing through the detector region of the photo-interruptive sensor 30, an absolute rotational position of the mounting shaft 15 relative to the vehicle wheel alignment sensor unit 12 and vehicle wheel 10. The absolute rotational position from the 0° base point is identified at the second edge transition between a tooth 32 and gap 38 as it passes through the detector region of the photo-interruptive sensor 30. Subsequent rotation of the mounting shaft 15 relative to the vehicle wheel alignment sensor unit 12 is tracked in a conventional manner by the micro-processor or logic circuit 100 using signals received from the relative rotational position sensor, once the absolute rotational position has been identified.

Figure 7:
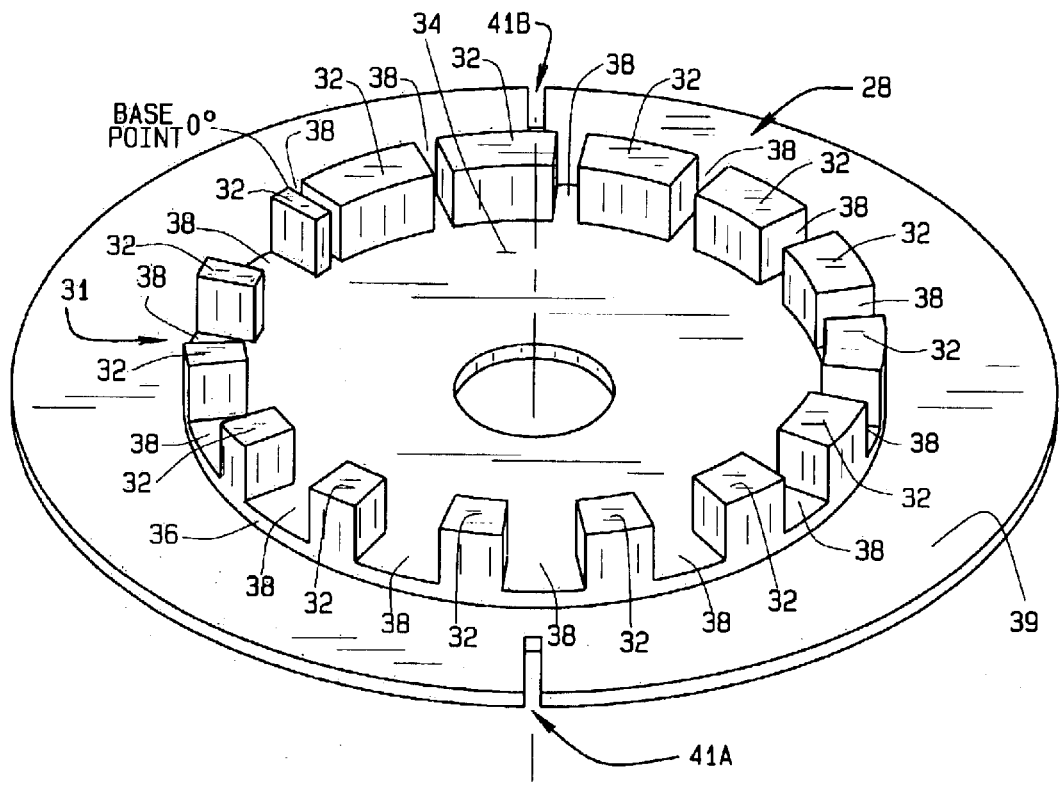
FIG. 7 is a perspective view of an alternate embodiment of the interrupter disk of FIG. 4.

In an alternate embodiment of the present invention, shown in FIG. 7, a circumferential flange 39 is incorporated into the base 31 of the interrupter disk 28 to facilitate identification of one or more predetermined rotational positions of the mounting shaft 15 relative to the vehicle wheel alignment sensor unit 12 without requiring rotational movement thereof. The circumferential flange 39 includes a pair of diametrically opposed slots 41A and 41B. Slot 41A is radially aligned with a gap 38, while slot 41B is radially aligned with a tooth 32, thereby providing for unique identification of each slot 41A and 41B. During assembly, one of the slots 41A or 41B is aligned with an indicator marking on the mounting shaft 15, thereby providing a fixed reference rotational position for the mounting shaft 15 relative to the vehicle wheel alignment sensor unit 12.

Figure 9:
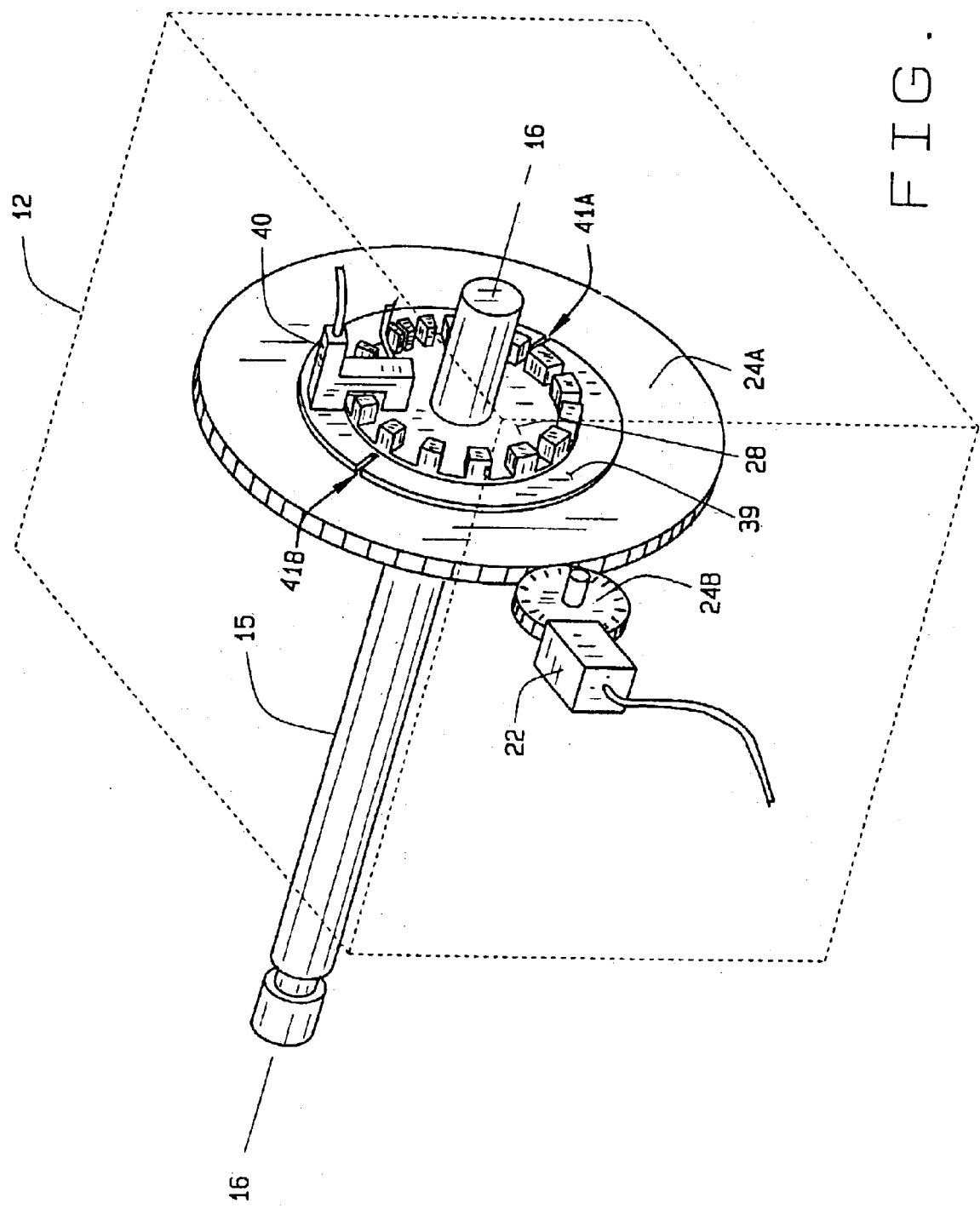
FIG. 9 is a perspective view of an alternate embodiment of the absolute rotational position sensor apparatus of the present invention, shown coupled to a vehicle wheel alignment sensor unit mounting shaft.

An adapter photo-interrupter sensor 40 of the alternate embodiment is disposed in operative relationship to the circumferential flange 39, such that during rotation of the interrupter disk 28, the slots 41A and 41B pass through a detector region of the photo-interrupter sensor 40. Preferably, the adapter photo-interrupter sensor 40 and the photo-interrupter sensor 30 are in radial alignment about the mounting shaft 15, as shown in FIG. 9, however, those of ordinary skill in the art will recognize that the adapter photo-interrupt sensor 40 and the photo-interrupt sensor 30 may be radially displaced from each other in a known relationship. Adapter photo-interrupt sensor 40 is of a conventional design, and includes a detector region in which light passes, such that a sensor detects the presence or absence of light. Preferably, adapter photo-interrupt sensor 40 is configured to detect a reflection of light from a reflective surface disposed behind the circumferential flange 39 when slots 41A and 41B are within the detector region.

The reflective surface may optionally be disposed on the face of the gear 24A or other structure disposed behind the circumferential flange 39 when the interrupter disk 28 is secured to the mounting shaft 15 as previously described. Preferably, the circumferential flange 39 is composed of, or coated with, a non-reflective material, thereby enhancing the contrast with the reflective material. However, those of ordinary skill in the art will recognize that the non-reflective and reflective materials may be varied or swapped, provided that the adapter photo-detector 40 or other suitable sensor can optically detect the presence of a slot 41A or 41B within the detector region.

Figure 8:
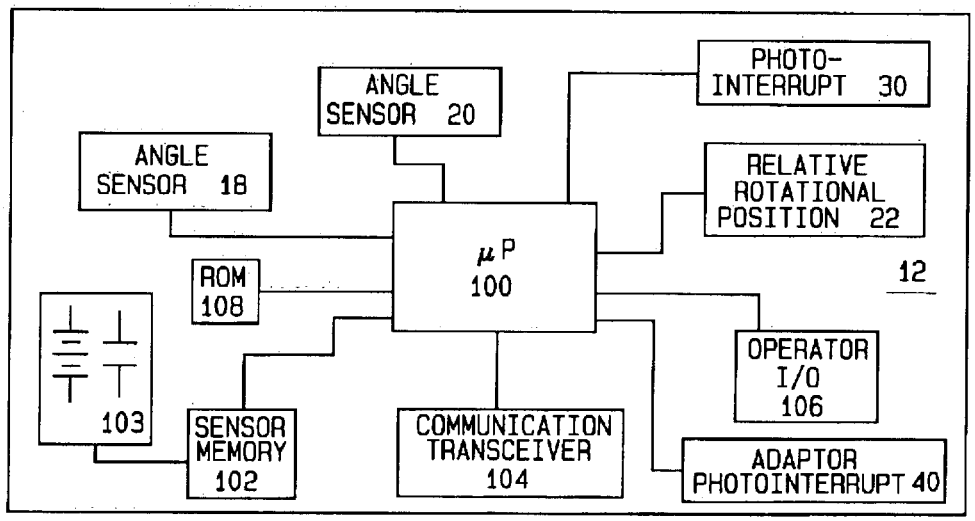
FIG. 8 is a block diagram view of the components of a cordless vehicle wheel alignment sensor incorporating an alternate embodiment of the present invention.

As shown in the alternate embodiment circuit of FIG. 8, the signals from the adapter photo-interrupter sensor 40 are routed to a micro-processor or logic circuit 100 in the vehicle wheel alignment sensor unit 12, together with the signal from the photo-interrupter sensor 30. The signals from the photo-interrupter sensor 30 provide sufficient information to identify the presence of a tooth 32 or gap 38 within the detector region of the photo-interrupter sensor 30. Correspondingly, signals from the adapter photo-interrupter sensor 40 provide sufficient information to identify the presence or absence of a slot 41A or 41B within the associated detector region.

In addition to being configured to perform the conventional functions of a vehicle wheel alignment sensor as described above, the micro-processor or logic circuit 100 is configured to utilize the detection of a slot 41A or 41B, together with the signal from the photo-interrupter sensor 30 identifying the presence of either a tooth 32 or gap 38, to uniquely identify the detection of slot 41A or 41B, and the corresponding rotational position of the mounting shaft 15 relative to the vehicle wheel alignment sensor unit 12, i.e. relative to the vehicle wheel 10. This unique identification of slot 41A or 41B, or the detection of the absence of slot 41A or 41B from the detector region of adapter photo-interrupter 40 occurs without the need to rotate the mounting shaft 15 relative to the vehicle wheel alignment sensor unit 12.

Using a look-up table correlating slots 41A and 41B with absolute rotational positions, stored in a persistent sensor memory 108 such as an ROM, EPROM, or EEPROM, the micro-processor or logic circuit 100 determines, from the detected presence of a slot 41A or 41B, together with the detection of a tooth 32 or gap 38 in the detector region of the photo-interruptive sensor 30, an absolute rotational position of the mounting shaft 15 relative to the vehicle wheel alignment sensor unit 12 and the vehicle wheel 10. In addition, the micro-processor or logic circuit 100 determines a relative rotational position between a predetermined marking on the mounting shaft 15 and the vehicle wheel alignment sensor unit 12.

During use, a vehicle wheel alignment sensor unit 12 incorporating the absolute rotational position sensor assembly 26 of the first embodiment is secured to a vehicle wheel, such as through the use of a wheel clamp 14. Prior to the obtaining the first vehicle wheel alignment measurements, the vehicle wheel alignment sensor unit 12 must be compensated for any runout or wobble present in the mounting to the vehicle wheel 10. A runout compensation procedure is completed, and data representative of, or sufficient to reconstruct, a sinusoidal pattern of runout present for a complete rotation about the mounting shaft 15 is obtained and stored in the sensor memory 102.

As previously described, to compensate a vehicle wheel alignment measurement for runout between the vehicle wheel alignment sensor unit 12 and the vehicle wheel 10, it is necessary to know the rotational position of one relative to the other about the mounting shaft 15, as well as the corresponding runout value for that rotational position. Upon completion of the runout compensation procedure, the micro-processor or logic circuit 100 continuously tracks all subsequent rotational movements of the mounting shaft 15 relative to the vehicle wheel alignment sensor unit 12 through signals obtained from the relative rotational position sensor 22. In addition, upon completion of the runout compensation procedure, the absolute rotational position sensor assembly 26 of the present invention is utilized by the micro-processor or logic circuit 100 to identify an absolute rotational position RC1 of the vehicle wheel alignment sensor unit 12 associated with at least one point on the runout compensation sinusoidal waveform. Position RC1 is stored in the sensor memory 102, together with sufficient information to reconstruct the runout sinusoidal waveform for each rotational position of the vehicle wheel alignment sensor unit 12.

Upon restoration of power following an interruption in power supplied to the vehicle wheel alignment sensor unit 12, such as may be caused by a battery discharge, poor electrical contact with the battery leads, or an intentional operator shutdown while in use, which results in a discontinuity in the tracking of the rotational movements or position of the mounting shaft 15 relative to the wheel alignment sensor unit 12, the micro-processor or logic circuit 100 is configured to utilize the data stored in the sensor memory 102, together with a new absolute rotational position measurement, to resume normal sensor operation without the need to repeat the runout compensation procedures.

Assuming that the vehicle wheel alignment sensor unit 12 has not been dismounted from the vehicle wheel 10 during the interruption in power or shutdown, the runout compensation values previously obtained and stored in the sensor memory 102 remain valid for all rotational positions of the vehicle wheel alignment sensor unit 12. What is unknown immediately after restoration of the power or restart of the system is, the current rotational position of the mounting shaft 15 relative to the vehicle wheel alignment sensor unit 12. For example, it is possible that the mounting shaft 15 was rotated relative to the vehicle wheel alignment sensor unit 12 during the time the power was interrupted, or the vehicle wheel 10 was rolled forward or backwards. Hence, the tracking of the rotational position by the micro-processor or logic circuit 100 using the relative rotational position sensor 22 is no longer in-sync with the stored runout compensation values.

To re-synchronize the current rotational position of the vehicle wheel alignment sensor unit 12 and the stored runout compensation values, the micro-processor or logic circuit 100 is configured to utilize the absolute rotational position sensor assembly 26 of the present invention to obtain a current absolute rotational position RC2 for the vehicle wheel alignment sensor unit 12. To obtain the current absolute rotational position RC2, an operator is required to rotate the mounting shaft 15 in either direction relative to the vehicle wheel alignment sensor unit, either by rotating the vehicle wheel alignment sensor unit 12 or by rolling the vehicle wheel 10, through a rotational arc sufficient to pass at least one complete unique tooth 32 or gap 38 through the detector region of the photo-interruptive sensor 30. The arc length of the rotation is tracked by the micro-processor or logic circuit 100 using signals from the relative rotational position sensor 22, as previously described.

Once the current absolute rotational position RC2 of the mounting shaft 15 relative to the vehicle wheel alignment sensor unit 12 is obtained by the micro-processor or logic circuit 100, the current absolute rotational position RC2 is utilized together with the stored data representative of the sinusoidal runout pattern and previous absolute rotational position RC1 to re-synchronize the rotation of the mounting shaft 15 relative to the vehicle wheel alignment sensor unit 12 with the previously determined runout compensation sinusoidal waveform. Subsequent rotation of the mounting shaft 15 relative to the vehicle wheel alignment sensor unit 12 is tracked by the relative rotation position sensor 22, and an associated runout compensation value obtained by the micro-processor or logic circuit 100 using the stored runout sinusoidal waveform data.

Using the absolute rotational position sensor assembly 26 of the present invention together with signals from the relative rotational position sensor 22 further permits the micro-processor or logic circuit 100 to identify an absolute rotational position on the mounting shaft 15, such as a "zero" position, or other operator identified rotational position, and to guide an operator to return the vehicle wheel alignment sensor unit 12 to the identified absolute rotational position at any point during a vehicle wheel alignment procedure, including subsequent to a loss of power to the vehicle wheel alignment sensor unit 12 or system shut down.

The optional embodiment of the present invention shown in FIGS. 7 and 8 is intended for use when the vehicle wheel alignment sensor unit 12 is mounted to a conventional "no-compensation" type wheel adapter. A no-compensation wheel adapter, such as shown in U.S. Pat. No. 6,427,346 B1 to Stieff et al, herein incorporated by reference, is designed to facilitate attachment of a wheel alignment sensor unit 12 to a vehicle wheel 10 without the need for any runout compensation. This type of wheel adapter operates on the assumption that the runout of the vehicle wheel is negligible, and that the manufacturing process of the wheel adapter itself does not induce any additional runout in the system, hence there is no need to rotate the vehicle wheel 10 or the wheel alignment sensor unit 12 to different positions to compensate for runout within the system. These no-compensation wheel adapters are configured to minimize orientation errors. By configuring the wheel adapter to contact a vehicle wheel 10 (or other suspension component) in a reliable and repeatable manner, and by choosing points on the vehicle wheel 10 (or other suspension component) that provide a reference which closely represents that plane of rotation of the vehicle wheel 10, mounting errors incurred by the wheel adapter can be minimized. Careful fabrication of the wheel adapter itself to minimal tolerances minimizes any position and orientation errors between the mounting shaft 15 and the wheel adapter, and the wheel adapter contact points on the vehicle wheel 10 (or other suspension component).

During mounting of the vehicle wheel alignment sensor unit 12 to a no-compensation type wheel adapter, a technician is required to determine when the wheel alignment sensor unit 12 is aligned with the scribed mark on the mounting shaft 15 at the top-dead-center position, thereby mounting the wheel alignment sensor unit 12 to the no-compensation adapter in a repeatable manner. By providing a known slot 41A or 41B in a fixed rotational position corresponding to the top-dead-center of the mounting shaft 15, the alternate embodiment of the present invention shown in FIG. 7 through FIG. 9 provides an operator with electronic guidance to correctly mount the wheel alignment sensor unit 12 on a no-compensation type wheel adapter. Signals from the adapter photo-detector 40 identify to the micro-controller or logic circuit 100 when the wheel alignment sensor unit 12 is rotational aligned with either slot 41A or slot 41B. Additional signals from the photo-detector 30, indicating the presence of either a tooth 32 or gap 38 at the same rotational position provide unique identifying information, permitting the micro-processor or logic circuit 100 to positively identify which slot 41A or 41B has been detected.

Predetermined information identifying either slot 41A or slot 41B as being aligned with the top-dead-center position of the mounting shaft 15 provides the micro-processor or logic circuit 100 with sufficient information to signal a correct mounting position on the no-compensation adapter for the wheel alignment sensor unit 12, or to provide an the operator with sufficient guidance to achieve the desired mounting position. The micro-processor or logic circuit 100 may be configured to provide LED illumination or a directional indication identifying the rotational position or direction to which the operator should rotate the wheel alignment sensor unit 12 for mounting on the no-compensation type adapter at the top-dead-center position.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose micro-processor, the computer program code segments configure the micro-processor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved vehicle wheel alignment sensor unit including a housing, a mounting shaft about which the housing is rotatably disposed, a relative rotational position sensor operatively coupled to the mounting shaft and to the housing, the relative rotational position sensor providing a relative rotational movement signal and a rotational directional signal to a micro-processor, the improvement comprising:

at least one unique identification mark associated with the mounting shaft, said at least one unique identification mark identifying a predetermined rotational position of the mounting shaft relative to the housing;

a detector disposed in the housing, said detector configured to detect said at least one unique identification mark; and wherein the micro-processor is configured to receive communications from said detector, and to utilize said received communications, together with the relative rotational movement and rotational directional signals, to identify an absolute rotational position of the mounting shaft relative to the housing.

2. The improved vehicle wheel alignment sensor unit of claim 1 wherein:

said at least one unique identification mark has a unique arcuate length disposed between a first edge transition and a second edge transition;

said detector is further configured to identify edge transitions, and to generate a signal upon detection of an edge transition; and wherein said micro-processor is configured to utilize the relative rotational movement and rotational directional signals to determine said unique arcuate length disposed between sequential edge transitions identified by signals generated by said detector.

3. The improved vehicle wheel alignment sensor unit of claim 2 wherein the micro-processor is further configured to associate an absolute rotational position of the mounting shaft relative to the housing with an edge transition signal generated by said detector.

4. The improved vehicle wheel alignment sensor unit of claim 1 further including a rechargeable power supply.

5. The improved vehicle wheel alignment sensor unit of claim 1 further including a sensor memory, said sensor memory operatively coupled to the micro-processor.

6. The improved vehicle wheel alignment sensor unit of claim 1 wherein said micro-processor is further configured to associate said identified absolute rotational position of the mounting shaft relative to the housing with runout compensation data.

7. The improved vehicle wheel alignment sensor unit of claim 1 further including:

a second at least one unique identification mark associated with the mounting shaft, said second at least one unique identification mark identifying a second predetermined rotational position of the mounting shaft relative to the housing;

a second detector disposed in the housing, said second detector configured to detect said second at least one unique identification mark; and wherein the micro-processor is further configured to receive communications from said second detector, and to utilize said received communications, together with said received communications from said first detector, to identify said second predetermined rotational position of the mounting shaft relative to the housing.

8. The improved vehicle wheel alignment sensor unit of claim 7 further including:

a circumferential flange disposed about the mounting shaft;

wherein said second at least one unique identification mark is a slot disposed in said circumferential flange; and said second detector is further configured to identify said slot, and to generate a signal upon detection of said slot.

9. The improved vehicle wheel alignment sensor unit of claim 8 wherein said micro-processor is further configured to associate said second predetermined rotational position of the mounting shaft relative to the housing with said signal generated by said second detector.

10. An improved vehicle wheel alignment sensor unit including a housing, a mounting shaft about which the housing is rotatably disposed, a relative rotational position sensor operatively coupled to the mounting shaft and to the housing, the relative rotational position sensor providing relative rotational movement and rotation direction signals to a micro-processor, the improvement comprising:

an interrupter disk disposed in a fixed relationship to the mounting shaft, said interrupter disk including at least one raised tooth and at least one gap, said at least one tooth and said at least one gap separated by a transition edge;

a detector disposed in the housing, said detector configured to detect said at least one tooth and said at least one gap, and to communicate with the micro-processor; and wherein said micro-processor is configured to receive communications from said detector, and to utilize said received communications from said detector, together with the relative rotational movement and rotation direction signals from the relative rotation position sensor, to identify an absolute rotational position of the mounting shaft relative to the housing.

11. The improved vehicle wheel alignment sensor unit of claim 10 wherein said detector is configured to communicate a first signal representative of a tooth to the micro-processor, and to communicate a second signal representative of a gap to the micro-processor;

wherein the micro-processor is configured to identify an arcuate length about said mounting shaft of said at least one tooth or said at least one gap using at least said first signal, said second signal, the relative rotational movement signal, and the rotation direction signal; and wherein said identified arcuate length is associated with at least one predetermined absolute rotational position of the mounting shaft relative to the housing.

12. The improved vehicle wheel alignment sensor unit of claim 10 wherein said detector is a photo-interruptive detector, said detector having a detector region operatively disposed to observe said at least one tooth and said at least one gap as said interrupter disk rotates coaxially with the mounting shaft.

13. The improved vehicle wheel alignment sensor unit of claim 10 wherein said interrupter disk includes a plurality of interposed teeth and gaps; and wherein each tooth and gap in said plurality of interposed teeth and gaps has a unique arcuate length.

14. The improved vehicle wheel alignment sensor unit of claim 10 wherein each transition edge between said at least one tooth and said at least one gap occurs at a predetermined absolute rotational position of the mounting shaft.

15. The improved vehicle wheel alignment sensor unit of claim 10 wherein the micro-processor is further configured to associate said identified absolute rotational position of the mounting shaft relative to the housing with runout compensation data.

16. The improved vehicle wheel alignment sensor unit of claim 10 wherein said interrupter disk further includes a circumferential flange;

at least one slot disposed in said circumferential flange, said at least one slot aligned with a predetermined rotational position of the mounting shaft;

a second detector disposed in the housing, said second detector configured to detect said at least one slot, and to communicate with said micro-processor; and wherein the micro-processor is configured to receive communications from said second detector, and to utilize said received communications, together with the received communications from said first detector, to identify a predetermined rotational position of the mounting shaft relative to the housing.

17. The improved vehicle wheel alignment sensor unit of claim 16 wherein the micro-processor is further configured to utilize the received communications from said first detector to uniquely identify said at least one slot.

18. The improved vehicle wheel alignment sensor unit of claim 16 further including a first slot disposed in said circumferential flange in radial alignment with a gap; and a second slot disposed in said circumferential flange in radial alignment with a tooth.

19. The improved vehicle wheel alignment sensor unit of claim 16 wherein said second detector is a photo-detector.

20. An vehicle wheel alignment sensor unit having a micro-processor and a rotating member, including:

a rotational position indicator assembly, said rotational position indicator assembly having a relative rotational position sensor in operable relationship to the rotating member, said relative rotational position sensor configured to generate a first signal representative of relative rotational movement of the rotating member and configured to generate a second signal representative of a direction of rotation of the rotating member;

one or more markings each having a unique arcuate length disposed in fixed relationship to the rotating member, each of said one or more markings having predetermined absolute rotational position about the rotating member;

a marking sensor configured to observe said one or more markings during rotation of the rotating member, said marking sensor having a detector region, said marking sensor configured to generate at least a signal representative of the presence of a marking within said detector region; and wherein the micro-processor is further configured to receive said first signal, said second signal, said marking presence signal, and to utilize each of said signals to determine an arcuate length of a marking passing through said detector region, said arcuate length identifying at least one predetermined absolute rotational position of the rotating member.

21. The wheel alignment sensor unit of claim 20 wherein each of said one or more markings is a tooth; and wherein said marking sensor is a photo-interruptive sensor.

22. The wheel alignment sensor unit of claim 20 further including a memory coupled to the micro-processor, said memory configured to store data associating at least one arcuate length of a marking with at least one predetermined absolute rotational position of the rotating member.

23. A method for identifying an absolute rotational position of a mounting shaft relative to a vehicle wheel alignment sensor unit, comprising:

tracking an arcuate length of rotation for the mounting shaft relative to the vehicle wheel alignment sensor unit;

identifying a direction of rotation associated with said arcuate length of rotation;

identifying a first rotational point having a fixed relationship to the mounting shaft during said tracking;

identifying a second rotational point having a fixed relationship to the mounting shaft during said tracking;

determining an arcuate length of rotation between said identified first and second rotational points;

retrieving, from a memory, a predetermined absolute rotational position of the mounting shaft relative to the vehicle wheel alignment sensor unit corresponding to said determined arcuate length of rotation and said tracked direction of rotation.

24. The method of claim 23 for identifying an absolute rotational position of a mounting shaft relative to a vehicle wheel alignment sensor unit further comprising the step of utilizing said retrieved predetermined absolute rotational position in conjunction with stored runout compensation data.

25. The method of claim 23 for identifying an absolute rotational position of a mounting shaft relative to a vehicle wheel alignment sensor unit where the steps of identifying first and second rotational points each include identifying a transition point between a first indicator and a second indicator having a fixed relationship to the mounting shaft.

26. The method of claim 23 for identifying an absolute rotational position of a mounting shaft relative to a vehicle wheel alignment sensor unit further comprising the step of utilizing said retrieved predetermined absolute rotational position to direct rotation of said mounting shaft relative to the vehicle wheel alignment sensor unit to a second predetermined absolute rotational position.

27. A method for re-establishing runout compensation of a vehicle wheel alignment sensor unit mounted on a mounting shaft operatively coupled to a vehicle wheel, comprising the steps of:

obtaining runout compensation data representative of runout present about a complete rotation of the mounting shaft relative to the vehicle wheel alignment sensor unit;

associating said runout compensation data with at least one absolute rotational position of the mounting shaft vehicle relative to the wheel alignment sensor unit;

storing said obtained runout compensation data and said associated absolute rotational position in a memory;

tracking a relative rotation of the mounting shaft relative to the vehicle wheel alignment sensor unit;

utilizing said tracked relative rotation to identify one or more runout compensation values associated with a current rotation position of the mounting shaft relative to the vehicle wheel alignment sensor unit; and subsequent to a discontinuity in said tracked rotation, (a) identifying a current absolute rotational position of the mounting shaft relative to the vehicle wheel alignment sensor unit; and (b) correlating said current absolute rotational position with said stored associated absolute rotational position to resume utilizing said tracked relative rotation to identify one or more runout compensation values associated with a current rotation position of the mounting shaft relative to the vehicle wheel alignment sensor unit.

* * * * *

UNITED STATES PATENT AND TRADEMARK OFFICE
CERTIFICATE OF CORRECTION

PATENT NO.    : 6,796,036 B1  Page 1 of 1
DATED         : September 28, 2004
INVENTOR(S)   : John D. Klarer It is certified that error appears in the above-identified patent and that said Letters Patent is hereby corrected as shown below:

Column 5,
Line 57, replace "2.5°" with -- 21.5° --.
Line 59, replace "200" with -- 20° --.
Line 60, replace "1.250°" with -- 1.25° --.

Signed and Sealed this

Fifteenth Day of November, 2005

JON W. DUDAS
*Director of the United States Patent and Trademark Office*